UNITED STATES PATENT OFFICE.

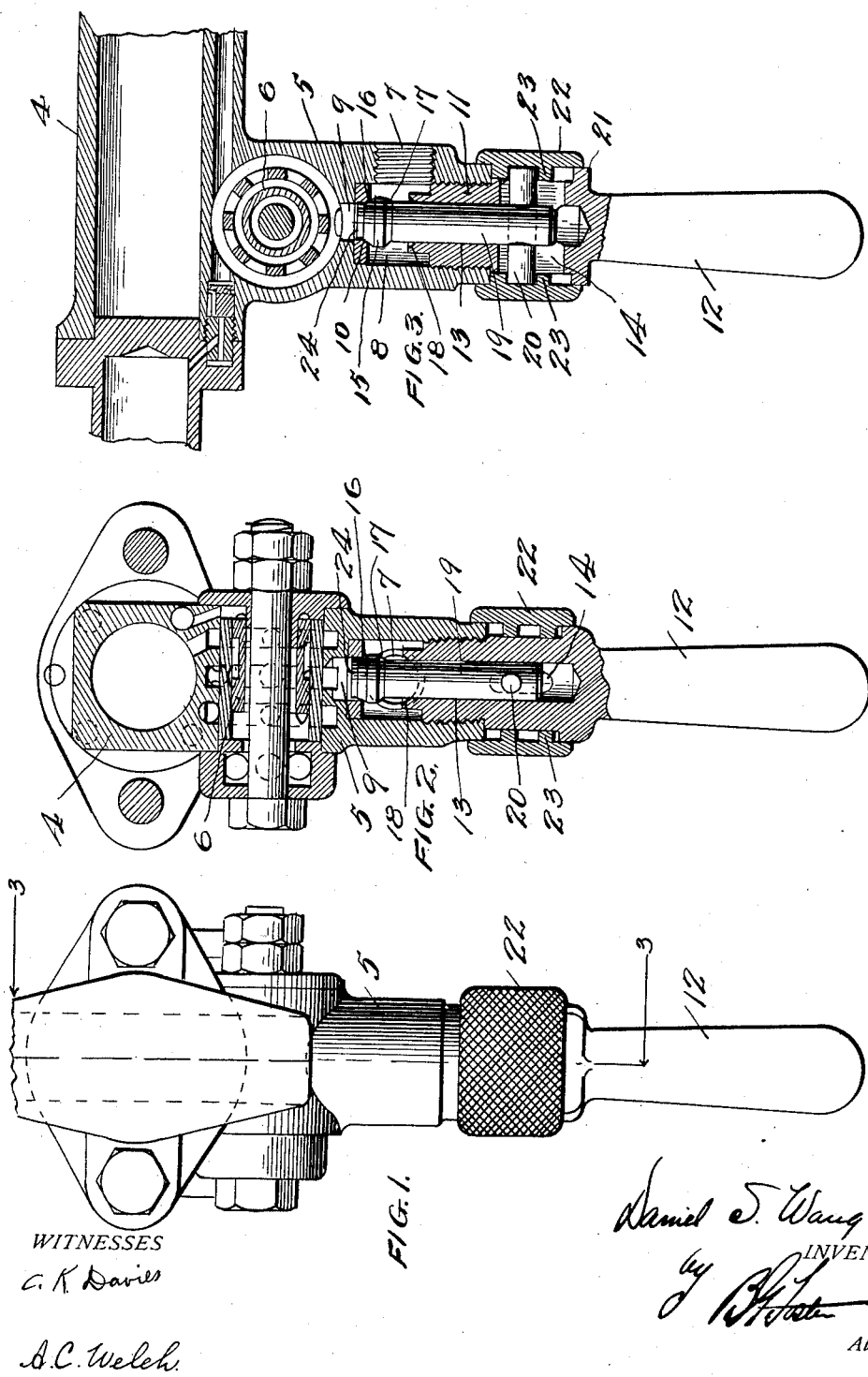

DANIEL SHAW WAUGH, OF DENVER, COLORADO, ASSIGNOR TO THE DENVER ROCK DRILL & MACHINERY CO., OF DENVER, COLORADO, A CORPORATION OF COLORADO.

THROTTLE-VALVE.

1,006,514.  Specification of Letters Patent.  Patented Oct. 24, 1911.

Application filed June 5, 1911. Serial No. 631,406.

*To all whom it may concern:*

Be it known that I, DANIEL S. WAUGH, a citizen of the United States, residing at Denver, in the county of Denver and State of Colorado, have invented new and useful Improvements in Throttle-Valves, of which the following is a specification.

The present invention relates to throttle valves for motive fluid operated motors, particularly those employing air.

The object is to provide a simple, practicable and efficient controlling valve mechanism, which is convenient to the operator, and is easily actuated.

The preferred form of construction is illustrated in the accompanying drawings, wherein:—

Figure 1 is a view in elevation of the structure. Fig. 2 is a sectional view therethrough. Fig. 3 is a sectional view at right angles to Fig. 2, or in other words, on the line 3—3 of Fig. 1.

Similar reference numerals designate corresponding parts in all the figures of the drawings.

A portion of the cylinder of a hammer drill is illustrated, and is designated 4. Projecting from one side of this cylinder, is a head 5, which contains the automatic controlling valve 6, the air being supplied to this valve through a suitable connection 7, made in one side of the head that leads to an internal motive fluid chamber. A port 9 affords communication between this internal chamber 8 and the automatic valve. This port is surrounded by a suitable valve seat 10. Threaded into the end of the head and into the end of the motive fluid chamber 8, is the stem 11 of a handle section 12, by means of which the drill can be turned. This handle section 12 is provided in its inner end portion with a longitudinal socket 13 that is intersected by a transverse slot 14.

A valve 15 operates in the chamber 8, and has oppositely beveled portions 16 and 17, the portion 16 being movable into and out of coaction with the valve seat 10, and the beveled portion 17 being movable into and out of coaction with a valve seat 18 that surrounds the inner end of the socket 13. The valve 15 is carried by a stem 19 that reciprocates in the socket 13, and this stem carries a cross pin 20 that is located in the slot 14, and projects beyond the opposite sides of the handle section. The said handle section at one end of the slot 14 is provided with an annular rib or flange 21, and held between this flange to the adjacent end of the head 5, is a knurled nut 22 that is rotatable upon the said handle section. This knurled nut is provided with an internal double thread 23 that is engaged with the projecting ends of the cross pin 20. The valve 15 is furthermore provided with a plug 24 that is movable into and out of the port 9, and is of slightly less diameter than the same.

It is believed that the operation of the device can now be made clear. It is only necessary to rotate the knurled nut in one direction to cause the valve 15 to close the port 9 by engaging the seat 10. When the nut is rotated in the opposite direction, the valve 15 will uncover the port 9 and the beveled portion 17 may be engaged with the seat 18, thus preventing leakage of the air through the socket 13.

The plug 24 is of importance, as it permits a slow admission of the air or motive fluid through the port 9. The employment of the cross pin 20 with a double thread upon the nut is also advantageous, in that it prevents any lateral strain upon the stem 19, and insures at all times the easy working of the valve. It will also be observed that with this structure, the valve actuating means is convenient to the operator who grasps the handle 12 to turn the drill. At the same time, there is practically nothing that projects from the handle in such a way as to interfere with the proper working of the drill.

From the foregoing, it is thought that the construction, operation and many advantages of the herein described invention will be apparent to those skilled in the art, without further description, and it will be understood that various changes in the size, shape, proportion and minor details of construction may be resorted to without departing from the spirit or sacrificing any of the advantages of the invention.

Having thus fully described my invention, what I claim as new, and desire to secure by Letters Patent, is:—

1. In a throttle valve, the combination with a handle casing, of a valve operating therein and having a stem provided with a plurality of outstanding projections, and a rotary operating device surrounding the handle casing and having internal threads with which the projections are engaged.

2. In a throttle valve, the combination with a handle casing, of a reciprocatory valve located therein and movable longitudinally thereof, said valve having a stem arranged longitudinally in the handle casing and said casing having a transverse slot, a cross pin extending through the stem and having both its ends projecting from the slot on opposite sides of the handle, and a rotary nut mounted on the handle casing and covering the slot, said nut having a double thread engaged by the ends of the cross pin.

3. In a throttle valve, the combination with a head, having an internal motive fluid chamber, a port opening through one side of the chamber, and a port in the inner end of the same, of a valve seat surrounding one of the ports, a handle section having a portion secured to the outer end of the head, a valve in the chamber coöperating with the valve seat and having a stem slidably mounted in the handle section, said stem having a cross pin projecting from the handle section, and a nut rotatably mounted on the handle section and having a thread engaging the cross pin.

4. In a throttle valve, the combination with a head having an internal motive fluid chamber, an inlet port opening through one side of the chamber and an outlet port leading from the inner end of the chamber, of a valve seat surrounding the outlet port, a handle section secured to the outer end of the head and having a longitudinal socket opening into the chamber, and a transverse slot that intersects the socket, a valve that coöperates with the valve seat, said valve having a stem slidably mounted in the socket, a cross pin passing through the stem and through the slot and having its ends projecting from opposite sides of the handle section, and a nut rotatably mounted in the handle section and having doubled threads engaging the projecting ends of the cross pin.

5. In a throttle valve, the combination with a head having a motive fluid chamber, a port opening through one side of the same, and a port opening through one end of the same, of a valve seat surrounding one of the ports, a handle section connected to the head and having a socket, and a valve seat surrounding the socket, a valve having a stem slidable in the socket and movable into engagement with the seat surrounding the port to cut off the passage of motive fluid through the chamber and being also movable into engagement with the seat surrounding the socket when the said valve is open to prevent leakage through the socket, and means for moving the valve.

6. In a throttle valve, the combination with a head having a motive fluid chamber, a port leading therefrom, and a valve seat surrounding the port, of a handle section having a portion threaded into the head, said handle section having a longitudinally disposed socket and a transverse slot, a valve seat surrounding the inner end of the socket, a valve operating in the motive fluid chamber between the two valve seats, and having a plug that is movable into and out of the port, said valve having a stem slidably mounted in the socket, a cross pin carried by the stem and projecting into the slot of the handle section, and a nut rotatably mounted on the handle section between the same and the head, said nut having an internal double thread engaging the ends of the cross pin.

In testimony whereof I have hereunto set my hand in presence of two subscribing witnesses.

DANIEL SHAW WAUGH.

Witnesses:
 W. H. LEONARD,
 JAS. R. ELMENDORF.

---

Copies of this patent may be obtained for five cents each, by addressing the "Commissioner of Patents, Washington, D. C."